United States Patent
Tani et al.

(10) Patent No.: US 11,241,913 B2
(45) Date of Patent: Feb. 8, 2022

(54) RUBBER COMPOSITION, CROSSLINKED PRODUCT, AND TIRE

(71) Applicant: JSR Corporation, Minato-ku (JP)

(72) Inventors: Koichiro Tani, Minato-ku (JP); Takuya Sano, Minato-ku (JP); Takato Fukumoto, Minato-ku (JP); Naoki Sugiyama, Minato-ku (JP); Kunpei Kobayashi, Minato-ku (JP); Takumi Adachi, Minato-ku (JP); Jiro Ueda, Minato-ku (JP); Ryoji Tanaka, Minato-ku (JP)

(73) Assignee: JSR Corporation, Minato-ku (JP)

( * ) Notice: Subject to any disclaimer, the term of this patent is extended or adjusted under 35 U.S.C. 154(b) by 253 days.

(21) Appl. No.: 16/542,453

(22) Filed: Aug. 16, 2019

(65) Prior Publication Data

US 2020/0086687 A1    Mar. 19, 2020

(30) Foreign Application Priority Data

Sep. 14, 2018   (JP) .............................. JP2018-173053

(51) Int. Cl.
  *C08L 15/00*   (2006.01)
  *B60C 1/00*   (2006.01)
  *C08K 3/36*   (2006.01)
  *C08K 9/06*   (2006.01)

(52) U.S. Cl.
  CPC .......... *B60C 1/0016* (2013.01); *B60C 1/0025* (2013.01); *C08K 3/36* (2013.01); *C08K 9/06* (2013.01); *C08L 15/00* (2013.01); *C08L 2312/00* (2013.01)

(58) Field of Classification Search
  CPC ...... C08L 15/00; C08L 2312/00; C08L 65/00; B60C 1/0016; B60C 1/0025; C08K 3/36; C08K 9/06; C08K 9/04; C08C 19/44; C08C 19/22; C08C 19/02; C08F 236/10; C08G 61/08
  USPC ........................................................ 523/206
  See application file for complete search history.

(56) References Cited

U.S. PATENT DOCUMENTS

| 2011/0136968 | A1  | 6/2011 | Hattori et al. | |
|---|---|---|---|---|
| 2013/0160910 | A1* | 6/2013 | Hennebert | C08L 7/00 |
| | | | | 152/450 |
| 2013/0165560 | A1* | 6/2013 | Belmont | C08K 9/04 |
| | | | | 524/105 |
| 2015/0361210 | A1  | 12/2015 | Nosaka et al. | |
| 2019/0218378 | A1* | 7/2019 | Adachi | C08J 3/226 |
| 2020/0087490 | A1* | 3/2020 | Tani | C08K 3/36 |
| 2020/0247982 | A1* | 8/2020 | Sano | B60C 1/0016 |

FOREIGN PATENT DOCUMENTS

| JP | 09-110904 A | 4/1997 |
|---|---|---|
| JP | 2006-206872 A | 8/2006 |
| JP | 2006-249069 A | 9/2006 |
| JP | 2011-140628 A | 7/2011 |
| JP | 2014-080504 A | 5/2014 |
| WO | WO 2014/133097 A1 | 9/2014 |
| WO | WO 2018/062473 A1 | 4/2018 |

OTHER PUBLICATIONS

Extended European Search Report dated Feb. 20, 2020 in corresponding European Patent Application No. 19190178.4, 6 pages.
Office Action dated Dec. 14, 2021 in Japanese Patent Application No. 2018-173053 (w/ computer-generated English translation).

\* cited by examiner

*Primary Examiner* — Hannah J Pak
(74) *Attorney, Agent, or Firm* — Oblon, McClelland, Maier & Neustadt, L.L.P.

(57) ABSTRACT

A rubber composition contains:
  (A) a polymer having a carbon-carbon unsaturated bond and exhibiting a value α of 0.6 or more as obtained by the following formula (i):

$$\alpha = (p + (0.5 \times r))/(p + q + (0.5 \times r) + s) \qquad (i)$$

wherein p, q, r, and s are the proportions by mole of structural units represented by the following formulae (1), (2), (3), and (4), respectively in the polymer:

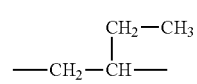

(1)

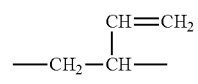

(2)

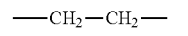

(3)

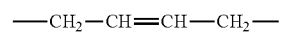

(4)

and
(B) modified silica.

20 Claims, No Drawings

RUBBER COMPOSITION, CROSSLINKED PRODUCT, AND TIRE

CROSS-REFERENCE TO RELATED APPLICATIONS

The present application claims priority under 35 U.S.C. § 119 to Japanese Patent Application No. 2018-173053, filed Sep. 14, 2018. The contents of this application are incorporated herein by reference in their entirety.

BACKGROUND OF THE INVENTION

Field of the Invention

The present disclosure relates to a rubber composition, a crosslinked product, and a tire.

Discussion of the Background

Conjugated diene-based polymers (e.g., a styrene-butadiene copolymer) produced through polymerization of a conjugated diene compound exhibit good properties (e.g., thermal resistance, wear resistance, mechanical strength, and processability). Thus, the conjugated diene-based polymers have been used in various industrial products, including pneumatic tires, vibration-proof rubber bodies, and hoses. In particular, conjugated diene-based polymers (e.g., S-SBR) produced through solution polymerization have a relatively narrow molecular weight distribution and are suitable as a material for producing a fuel-efficient tire.

The raw material of crosslinked rubber has been known to contain a reinforcing agent (e.g., carbon black or silica) for securing the durability and wear resistance of the rubber. Silica functions as a reinforcing agent for rubber. Silica is widely used, since it is superior to carbon black in view of the compatibility between rolling resistance and braking performance. However, silica particles are likely to aggregate in a rubber composition and may exhibit poor dispersibility therein, since they have silanol groups on their surfaces.

There has conventionally been proposed a rubber composition containing silica and a silane coupling agent, or a rubber composition containing silica and a modified conjugated diene-based polymer prepared through modification of a terminal or main chain of a conjugated diene-based polymer with a functional group that interacts with silica (see, for example, Japanese Patent Application Laid-Open (kokai) No. H09-110904). There has also been proposed a rubber composition containing modified conjugated diene-based rubber and modified silica prepared through surface treatment of silica with a silane coupling agent for further improving the silica dispersibility (see Japanese Patent Application Laid-Open (kokai) No. 2011-140628).

The fuel efficiency and prolonged service life of tires are important for reduction of environmental burdens. Thus, a demand has arisen for a rubber material achieving high strength and excellent wear resistance. The present applicant has proposed a tire member which is prepared from a hydrogenated product of a modified conjugated diene-based polymer having a functional group (e.g., an amino group or an alkoxysilyl group) at one or both terminals of the polymer, and which achieves high strength and high wear resistance (see International Patent Publication WO 2014/133097).

SUMMARY OF THE INVENTION

According to one aspect of the present disclosure, a rubber composition includes (A) a polymer having a carbon-carbon unsaturated bond and exhibiting a value α of 0.6 or more as obtained by formula (i):

$$\alpha=(p+(0.5\times r))/(p+q+(0.5\times r)+s) \qquad (i)$$

wherein p, q, r, and s are the proportions by mole of structural units represented by formulae (1), (2), (3), and (4), respectively in the polymer:

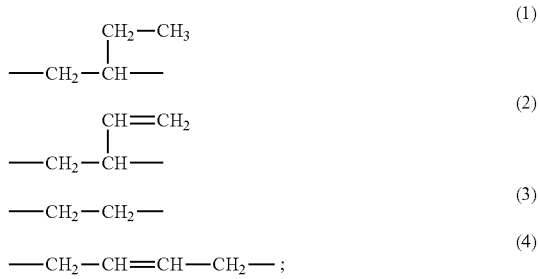

and
(B) modified silica.

According to another aspect of the present disclosure, a crosslinked product is obtained through crosslinking of the rubber composition.

According to another aspect of the present disclosure, a tire includes a tread and a sidewall, wherein the tread, the sidewall, or both are formed of the crosslinked product.

DESCRIPTION OF THE EMBODIMENTS

When a crosslinked rubber is produced from a rubber composition containing silica and a hydrogenated product of a modified conjugated diene-based polymer as disclosed in International Patent Publication WO 2014/133097, the resultant crosslinked rubber exhibits high strength and high wear resistance, but does not necessarily achieve sufficient fuel efficiency.

In view of the foregoing, an object of the present disclosure is to provide a rubber composition to obtain a crosslinked product capable of ensuring high strength and wear resistance and exhibiting well-balanced low hysteresis loss property.

According to the present disclosure, there can be produced a crosslinked product exhibiting high strength, high wear resistance, and excellent low hysteresis loss property.

<<Rubber Composition>>

The rubber composition of the present disclosure will next be described. As used herein, the term "to" between two numerical values indicates that the numeric values before and after the term are inclusive as the lower limit value and the upper limit value, respectively. The rubber composition of the present disclosure contains (A) a highly saturated polymer and (B) modified silica.

<Highly Saturated Polymer (A)>

The highly saturated polymer (A) (hereinafter may be referred to simply as "polymer (A)") exhibits a value α of 0.6 or more as obtained by the following formula (i):

$$\alpha=(p+(0.5\times r))/(p+q+(0.5\times r)+s) \qquad (i)$$

wherein p, q, r, and s are the proportions by mole of structural units represented by the following formulae (1), (2), (3), and (4), respectively in the polymer (A).

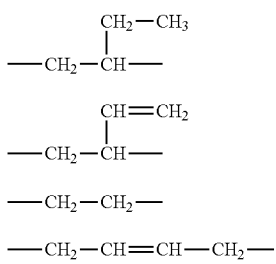

No particular limitation is imposed on the polymer (A), so long as the value α obtained by the aforementioned formula (i) is 0.6 or more, and the polymer (A) has at least one carbon-carbon unsaturated bond (preferably two or more carbon-carbon unsaturated bonds) in the molecule. The polymer (A) is preferably a polymer formed of an unsaturated hydrocarbon monomer. As used herein, the term "unsaturated hydrocarbon" refers to a hydrocarbon having one or more unsaturated bonds in the molecule, and includes an aliphatic hydrocarbon and an aromatic hydrocarbon. Specific examples of the polymer (A) include polymers having a structural unit derived from a conjugated diene compound (hereinafter such a polymer may be referred to as a "conjugated diene-based polymer") and cyclic olefin polymers (e.g., cyclopentene ring-opened polymers). Of these, the polymer (A) is preferably at least one species selected from the group consisting of conjugated diene-based polymers and cyclic olefin polymers. The polymer (A) is more preferably a conjugated diene-based polymer, particularly preferably a hydrogenated product of a conjugated diene-based polymer (hereinafter may be referred to as a "hydrogenated conjugated diene-based polymer"), since such a polymer enables the resultant crosslinked rubber to have higher strength and wear resistance. The polymer (A) is preferably a copolymer further having a structural unit derived from an aromatic vinyl compound, since such a copolymer enables the resultant crosslinked rubber to have higher strength and wear resistance.

The value α of the polymer (A) is preferably 0.7 or more, more preferably 0.8 or more, still more preferably 0.9 or more, since such a value α enables the resultant crosslinked rubber to have higher strength and wear resistance. The value α is preferably 0.99 or less, since such a value α facilitates the crosslinking reaction of the polymer and enables the resultant crosslinked rubber to secure sufficient strength and wear resistance.

In the polymer (A), the total of the proportions of the structural units represented by the aforementioned formulae (1) to (4) (i.e., p+q+r+s) is preferably 40 mol % or more, more preferably 50 mol % or more, still more preferably 52 mol % or more, relative to the entire monomer units of the polymer (A).

In the present specification, each of the structural units represented by the formulae (1) to (4) may be the entirety or a portion of the structure of one monomer unit included in the polymer (A). Thus, when the polymer (A) has an ethylene chain in the main chain, a portion of the ethylene chain in the polymer (A) is formed of the structural unit represented by the formula (3). The polymer (A) does not necessarily have all of the structural units represented by the formulae (1) to (4). The polymer (A) may have only a portion of the structural units represented by the formulae (1) to (4), so long as the value α is 0.6 to 1.

Preferably, the polymer (A) exhibits a value β of 0.6 or less as obtained by the following formula (ii):

$$\beta = (p+q)/(p+q+(0.5 \times r)+s) \tag{ii}$$

wherein p, q, r, and s have the same meanings as defined in the formula (i) above.

In the polymer (A), the value β is preferably 0.6 or less, since such a value β enables the resultant crosslinked rubber to have sufficiently high wear resistance.

In the polymer (A), the value β is more preferably 0.15 to 0.6, since such a value β enables production of a rubber composition having excellent processability. The value β is still more preferably 0.17 to 0.58, particularly preferably 0.20 to 0.55, since such a value β achieves a better balance between processability and wear resistance.

In the polymer (A), the number of consecutive ethylene groups (hereinafter may be referred to as an "average ethylene chain length") is preferably 2 to 20 in the main chain. The average ethylene chain length preferably falls within the aforementioned range, since such an average ethylene chain length enables the resultant crosslinked rubber to secure sufficient wear resistance and to have higher strength. The average ethylene chain length is more preferably 2.2 to 15, still more preferably 2.3 to 12, particularly preferably 2.5 to 10. The average ethylene chain length (T3) is calculated as follows: the number of 1,4-butylene units (T1) and the number of 1,4-butylene chains each being composed of consecutive 1,4-butylene groups (T2) in the polymer are determined by means of $^{13}$C-NMR, and the average ethylene chain length (T3) is obtained by the following formula (5).

$$T3 = T1/T2 \tag{5}$$

No particular limitation is imposed on the method for producing the polymer (A), and the polymer (A) can be produced through any conventionally known method. For example, the cyclic olefin polymer can be produced through ring-opening metathesis polymerization of a monocyclic olefin, such as cyclopentene or cyclohexene. The hydrogenated conjugated diene-based polymer can be produced by a method including a polymerization step and a hydrogenation step as described below.

<Polymerization Step>

This step involves polymerization of a monomer containing a conjugated diene compound to thereby prepare a conjugated diene-based polymer having an active terminal. Examples of the conjugated diene compound include 1,3-butadiene, isoprene, 2,3-dimethyl-1,3-butadiene, 1,3-pentadiene, 1,3-hexadiene, 1,3-heptadiene, 2-phenyl-1,3-butadiene, 3-methyl-1,3-pentadiene, and 2-chloro-1,3-butadiene. Of these, at least one of 1,3-butadiene, isoprene, and 2,3-dimethyl-1,3-butadiene is preferred. Particularly preferred is 1,3-butadiene, since such a 1,3-butadiene achieves well-balanced improvements in processability and low hysteresis loss property. The structural units derived from the conjugated diene compounds in the conjugated diene-based polymer may be singly or in combination of two or more species.

The conjugated diene-based polymer may be a homopolymer of the conjugated diene compound, but is preferably a copolymer of a conjugated diene compound and an aromatic vinyl compound, since such a copolymer enables the resultant crosslinked rubber to have high strength and wear resistance. Examples of the aromatic vinyl compound include styrene, methylstyrene, ethylstyrene, t-butoxystyrene, vinylethylbenzene, divinylbenzene, vinylbenzyldimethylamine, (4-vinylbenzyl) dimethylaminoethyl ether, N,N-dimethylaminoethylstyrene, N,N- dimethylaminomethylstyrene, vinylpyridine, diphenylethylene, and a tertiary amino group-containing diphenylethylene (e.g., 1-(4-N,N-dimethylaminophenyl)-1-phenylethylene). Among these, at least one of styrene and α-methylstyrene is preferable.

When the conjugated diene-based polymer is the copolymer of the conjugated diene compound and the aromatic vinyl compound, the copolymer is preferably a random copolymer of the conjugated diene compound and the aromatic vinyl compound. The random copolymer may contain a block moiety formed of the conjugated diene compound or the aromatic vinyl compound. The conjugated diene-based polymer is particularly preferably a styrene-butadiene copolymer (SBR), since such a styrene-butadiene copolymer has high living properties during anionic polymerization.

When the conjugated diene-based polymer is a copolymer having a structural unit derived from the conjugated diene compound and a structural unit derived from the aromatic vinyl compound, the amount of the aromatic vinyl compound used for the polymerization is preferably 3 to 55 mass %, more preferably 5 to 50 mass %, relative to the total amount of the conjugated diene compound and aromatic vinyl compound used for the polymerization, since such an amount enables the resultant crosslinked rubber to have a better balance between low hysteresis loss property and wet skid resistance. The amount of the structural unit derived from the aromatic vinyl compound in the polymer is measured by means of $^1$H-NMR. These conjugated diene compounds and aromatic vinyl compounds each may be used singly or in combination of two or more species.

The conjugated diene-based polymer may have a structural unit derived from a compound other than the conjugated diene compound and the aromatic vinyl compound (hereinafter may referred to as "an additional compound"), so long as the advantageous effects of the present disclosure are not impaired. Examples of the additional compound include acrylonitrile, methyl (meth)acrylate, ethyl (meth)acrylate, ethylene, and α-olefin. The amount of the structural unit derived from the additional compound in the conjugated diene-based polymer is preferably 10 mass % or less, more preferably 5 mass % or less, relative to the total amount of the monomer units in the conjugated diene-based polymer.

The monomer may be polymerized using a solution polymerization method, a vapor-phase polymerization method, or a bulk polymerization method. When the polymer (A) is the hydrogenated conjugated diene-based polymer, the solution polymerization method is preferable. The monomer may be polymerized in a batch-wise manner or a continuous manner. When using the solution polymerization method, the monomer that includes the conjugated diene compound may be polymerized in an organic solvent in the presence of an initiator and an optional randomizer, for example.

At least one of an alkali metal compound and an alkaline-earth metal compound may be used as the initiator. The initiator is preferably Lithium compound. Examples of the lithium compound include methyllithium, ethyllithium, n-propyllithium, n-butyllithium, sec-butyllithium, tert-butyllithium, 1,4-dilithiobutane, and phenyllithium. The amount of the initiator used for the polymerization may be appropriately set according to target molecular weight of the polymer. The initiator is preferably used in an amount of 0.05 to 10 mmol based on 100 g of the monomer used for polymerization.

The monomer may be polymerized in the presence of a mixture of the at least one of the alkali metal compound and the alkaline-earth metal compound and a compound having a functional group that interacts with silica. The functional group that interacts with silica can be introduced into the polymerization-initiation terminal of the conjugated diene-based polymer by polymerizing the monomer in the presence of the mixture. As used herein, the term "functional group that interacts with silica" means a group having an element that interacts with silica, such as nitrogen, sulfur, phosphorus, oxygen, or silicon. The silicon possessed by the "functional group that interacts with silica" is silicon in the hydrocarbyloxysilyl group. The term "interaction" means that a covalent bond is formed between molecules, or an intermolecular force (intermolecular electromagnetic force such as ion-dipole interaction, dipole-dipole interaction, a hydrogen bond, or Van der Waals force) that is weaker than a covalent bond is formed.

The compound used in the modification of the polymerization-initiation terminal is preferably a nitrogen-containing compound (e.g., a secondary amine compound). Specific examples of the nitrogen-containing compound include dimethylamine, piperidine, pyrrolidine, hexamethyleneimine, N-(trimethylsilyl)piperazine, N-(tert-butyldimethylsilyl)piperazine, N,N'-dimethyl-N'-trimethylsilyl-1,6-diaminohexane, and 1,3-ditrimethylsilyl-1,3,5-triazinane.

The randomizer may be used to adjust vinyl bond content that represents the content of vinyl bonds in the polymer, for example. Examples of the randomizer include dimethoxybenzene, tetrahydrofuran, dimethoxyethane, diethylene glycol dibutyl ether, diethylene glycol dimethyl ether, 2,2-di(tetrahydrofuryl)propane, 2-(2-ethoxyethoxy)-2-methylpropane, triethylamine, pyridine, N-methylmorpholine, and tetramethylethylenediamine. These compounds may be used either alone or in combination.

The organic solvent used for polymerization may be an organic solvent that is inert to the reaction. Examples of the organic solvent include aliphatic hydrocarbons, alicyclic hydrocarbons, and aromatic hydrocarbons. Of these, the organic solvent is preferably a hydrocarbon having 3 to 8 carbon atoms. Specific examples of the hydrocarbon having 3 to 8 carbon atoms include propane, n-butane, isobutane, n-pentane, isopentane, n-hexane, cyclohexane, propene, 1-butene, isobutene, trans-2-butene, cis-2-butene, 1-pentyne, 2-pentyne, 1-hexene, 2-hexene, benzene, toluene, xylene, ethylbenzene, heptane, cyclopentane, methylcyclopentane, methylcyclohexane, 1-pentene, 2-pentene, and cyclohexene. These organic solvents may be used either alone or in combination.

When using the solution polymerization method, the monomer concentration in the reaction solvent is preferably 5 to 50 mass %, and more preferably 10 to 30 mass %, since such a monomer concentration enables maintain the balance between productivity and polymerization controllability. The polymerization reaction temperature is preferably −20 to 150° C., and more preferably 0 to 120° C. It is preferable to effect the polymerization reaction under a pressure sufficient to substantially maintain the monomer to be in a liquid phase. Such a pressure may be achieved by pressurizing the reactor using gas that is inert to the polymerization reaction, for example.

The aforementioned polymerization reaction can produce a conjugated diene-based polymer having an active terminal. The resultant conjugated diene-based polymer preferably has a weight average molecular weight (Mw) (in terms of polystyrene) of $1.0 \times 10^4$ to $2.0 \times 10^6$ as measured by means of gel permeation chromatography (GPC). The Mw of less than $1.0 \times 10^4$ may lead to deterioration of tensile strength, low fuel consumption performance and wear resistance of the resultant crosslinked rubber, whereas the Mw exceeding $2.0 \times 10^6$ may lead to poor processability of the rubber composition. The Mw is more preferably $1.2 \times 10^4$ to $1.5 \times 10^6$, still more preferably $1.5 \times 10^4$ to $1.0 \times 10^6$.

In the conjugated diene-based polymer produced through the aforementioned polymerization reaction, the vinyl bond content of a butadiene-derived structural unit is preferably 60 mol % or less, since such a vinyl bond content enables the resultant crosslinked rubber to have higher wear resistance. The vinyl bond content is more preferably 25 to 60 mol %, still more preferably 30 to 58 mol %, particularly preferably 33 to 55 mol %, since such a vinyl bond content enables the rubber composition to have higher processability. As used herein, the term "vinyl bond content" refers to the percentage of structural units having a 1,2-bond relative to all butadiene structural units in the polymer. The vinyl bond content is measured by means of $^1$H-NMR. The vinyl bond content (%) of the conjugated diene-based polymer can be obtained through multiplication of the value β calculated by the formula (ii) by 100.

<Terminal Modification Step>

A conjugated diene-based polymer having an active terminal is produced through the aforementioned polymerization step. The aforementioned polymerization reaction may be terminated by use of, for example, an alcohol. Alternatively, the conjugated diene-based polymer having an active terminal may be reacted with a coupling agent or a compound which has a functional group that interacts with silica and which can react with the active terminal (hereinafter the compound may be referred to as a "modifier"). The polymer (A) is preferably a modified conjugated diene-based polymer in which at least one of the polymerization initiation terminal and the polymerization end terminal is modified with a compound having a functional group that interacts with silica, since such a modified polymer can further improve the dispersibility of modified silica.

The modifier is preferably a compound having, as a functional group that interacts with silica, at least one group selected from the group consisting of an amino group, an imino group, a pyridyl group, a phosphino group, a thiol group, and a hydrocarbyloxysilyl group, since such a compound can more effectively improve low hysteresis loss property. Nitrogen, phosphorous, or sulfur contained in the functional group that interacts with silica may be protected with a protective group (e.g., a trisubstituted hydrocarbylsilyl group). The polymer (A) is particularly preferably a modified conjugated diene-based polymer having a terminal modified with a modifier having a nitrogen-containing group and a hydrocarbyloxysilyl group.

Examples of the modifier include N,N-bis(trimethylsilyl)aminopropylmethyldimethoxysilane, N,N-bis(trimethylsilyl)aminopropyltriethoxysilane, N,N-bis(trimethylsilyl)aminopropylmethyldiethoxysilane, N,N-bis(trimethylsilyl)aminoethyltrimethoxysilane, N,N-dimethylaminopropylmethyldiethoxysilane, 2-methyl-1-(3-(trimethoxysilyl)propyl)-4,5-dihydro-1H-imidazole, N-(1,3-dimethylbutylidene)-3-(triethoxysilyl)-1-propanamine, P,P-bis(trimethylsilyl)phosphinopropylmethyldimethoxysilane, S-trimethylsilylmercaptopropylmethyldimethoxysilane, 2,2-dimethoxy-1-(3-trimethoxysilylpropyl)-1,2-azasilodine, 2,2-dimethoxy-1-(3-trimethoxysilylpropyl)-1-aza-2-silacyclopentane, 2,2-dimethoxy-1-phenyl-1,2-azasiloridine, 1-trimethylsilyl-2,2-dimethoxy-1-aza-2-silacyclopentane, 2,2-dimethoxy-8-(4-methylpiperazinyl)methyl-1,6-dioxa-2-silacyclooctane, and compounds prepared through substitution of an alkyl group or an alkanediyl group in any of the aforementioned compounds by a C1 to C6 alkyl group or a C1 to C6 alkanediyl group, respectively. These modifiers may be used alone, or two or more modifiers may be used in combination.

The reaction of the polymerization active terminal and the modifier may be effected as a solution reaction, for example. The solution reaction may be effected using the solution that includes unreacted monomers after completion of the polymerization reaction, or may be effected after isolating the conjugated diene-based polymer included in the solution, and dissolving the conjugated diene-based polymer in an appropriate solvent (e.g., cyclohexane). The reaction may be effected in a batch-wise manner or a continuous manner. In this case, the compound used in the reaction with the polymerization active terminal may be added using an arbitrary method. For example, the compound may be added at a time, or may be added stepwise, or may be added successively.

In the aforementioned reaction, the amount of the modifier used may be appropriately determined depending on the type of the modifier. The amount of the modifier is preferably 0.1 mole equivalents or more, more preferably 0.3 mole equivalents or more, relative to the metal atom (responsible for the polymerization reaction) of the polymerization initiator. The reaction temperature is generally equal to the polymerization reaction temperature, and is preferably −20 to 150° C., more preferably 0 to 120° C., particularly preferably 20 to 100° C. The reaction time is preferably 1 minute to 5 hours, more preferably 2 minutes to 1 hour.

<Hydrogenation Step>

When obtaining the hydrogenated conjugated diene-based polymer, the modified or unmodified conjugated diene-based polymer produced through the aforementioned process is hydrogenated. The hydrogenation may be performed by any method under any conditions, so long as the resultant polymer exhibits a desired hydrogenation rate. Examples of the hydrogenation method include a method involving the use of a hydrogenation catalyst containing an organic titanium compound as a main component; a method involving the use of a catalyst containing an organic compound of iron, nickel, or cobalt and an organic metal compound (e.g., an alkylaluminum); a method involving the use of an organic complex of an organic metal compound of, for example, ruthenium or rhodium; and a method involving the use of a catalyst including a carrier (e.g., carbon, silica, or alumina) on which a metal (e.g., palladium, platinum, ruthenium, cobalt, or nickel) is supported.

The hydrogenation may be performed in a solvent that is inert to the catalyst and can dissolve the conjugated diene-based polymer (e.g., n-hexane, n-octane, or cyclohexane). The hydrogenation reaction may be effected by holding a polymer at a given temperature in a hydrogen atmosphere or an inert atmosphere, adding the hydrogenation catalyst to the conjugated diene-based polymer, and introducing hydrogen gas to pressurize the system to a given pressure. Examples of the inert atmosphere include helium, neon, and argon. The hydrogenation reaction process may be effected using a batch process, a continuous process, or a combination thereof. The hydrogenation catalyst is preferably added in an amount of 0.02 to 20 mmol per 100 g of the unhydrogenated conjugated diene-based polymer.

In the case where the polymer (A) is a hydrogenated conjugated diene-based polymer, a hydrogenation rate of a butadiene-derived structural unit is 60% or more in the polymer (A). The hydrogenation rate of 60% or more in the polymer (A) can achieve crosslinked rubber exhibiting sufficiently high mechanical strength and wear resistance. The hydrogenation rate is more preferably 70% or more, still more preferably 80% or more, particularly preferably 90% or more. The hydrogenation rate is preferably 99% or less, since such a hydrogenation rate facilitates the crosslinking reaction of the polymer and enables the resultant crosslinked rubber to secure sufficient strength and wear resistance. The hydrogenation rate is determined by means of $^1$H-NMR. The hydrogenation rate can be adjusted to a desired value by varying the amount of a hydrogenation catalyst, the hydrogen pressure during hydrogenation reaction, or the reaction time.

When the polymer (A) is a hydrogenated conjugated diene-based polymer, the expression "α of 0.6 or more" refers to the case where "the hydrogenation rate of a butadiene-derived structural unit is 60% or more." The "p+q+0.5r+s" refers to the proportion by mole of the butadiene-derived structural unit included in the polymer (A).

In the case where the polymer (A) is a hydrogenated conjugated diene-based polymer, the polymer is preferably produced through a method involving solution polymerization of a monomer containing butadiene in the presence of an alkali metal compound, a step of modifying the resultant polymer without any treatment of the polymer solution, and a subsequent step of hydrogenating the polymer. Such a method is industrially useful. In this case, the hydrogenated conjugated diene-based polymer is isolated from the above-prepared solution through removal of the solvent therefrom.

The polymer can be isolated by, for example, a known solvent removal method (e.g., steam stripping) and a drying operation (e.g., thermal treatment).

<Modified Silica (B)>

Modified silica has, on its surface, a functional group (besides a hydroxyl group) bonded to a silicon atom. Preferably, modified silica is prepared by surface treatment of hydrophilic silica with a treatment agent, such as a silane coupling agent or a hydrophobicizing agent. Examples of the silica (unmodified silica) used for preparation of modified silica include wet silica (hydrated silica), dry silica (silicic anhydride), colloidal silica, precipitated silica, calcium silicate, and aluminum silicate. Wet silica is preferably used, since it effectively achieves an improvement in fracture property and the compatibility between wet grip property and low rolling resistance. No particular limitation is imposed on the nitrogen adsorption specific surface area ($N_2$SA) of silica, and the nitrogen adsorption specific surface area is preferably 100 to 300 m$^2$/g. The nitrogen adsorption specific surface area of silica is measured according to ISO 5794/1.

No particular limitation is imposed on the silane coupling agent used for surface treatment of silica, and the silane coupling agent can be selected from a variety of conventionally known silane coupling agents incorporated into a rubber composition for improving the dispersibility of silica in a rubber component. Specific examples of the usable silane coupling agent include sulfur-containing organic silane compounds, such as bis(3-triethoxysilylpropyl) polysulfide, 3-trimethoxysilylpropylbenzothiazyl tetrasulfide, bis(3-triethoxysilylpropyl) tetrasulfide, bis(3-triethoxysilylpropyl) disulfide, bis(2-triethoxysilylpropyl) tetrasulfide, 3-mercaptopropyltrimethoxysilane, 3-mercaptopropylmethyldimethoxysilane, and mercaptosilane exemplified in Japanese Patent Application Laid-Open (kokai) No. 2006-249069; and nitrogen-containing organic silane compounds, such as 2-aminoethyltriethoxysilane, 2-aminoethylmethyldiethoxysilane, 3-aminopropyltriethoxysilane, and 3-(2-aminoethyl)aminopropylmethyltrimethoxysilane.

Examples of the hydrophobicizing agent include saturated and unsaturated fatty acids, such as hexanoic acid, decanoic acid, dodecanoic acid, palmitic acid, stearic acid, isostearic acid, and oleic acid; halogenated silane compounds, such as dimethyldichlorosilane, diethyldichlorosilane, methylphenyldichlorosilane, allylmethyldichlorosilane, vinylmethyldichlorosilane, and hexenylmethyldichlorosilane; and hydrocarbyl-group-containing silane compounds, such as methyltrimethoxysilane, dimethyldimethoxysilane, ethyltrimethoxysilane, n-octyltriethoxysilane, and vinylmethyldimethoxysilane.

In the case of preparation of modified silica, the aforementioned treatment agents may be used singly or in combination of two or more species. For example, modified silica is prepared by any of the following methods: (1) a method involving modification of unmodified silica with any of the aforementioned sulfur-containing organic silane compounds and a fatty acid; (2) a method involving surface treatment of unmodified silica with any of the aforementioned sulfur-containing organic silane compounds and nitrogen-containing organic silane compounds, and reaction of the resultant product with a fatty acid; and (3) a method involving modification of unmodified silica with any of the aforementioned sulfur-containing organic silane compounds and hydrocarbyl-group-containing silane compounds. No particular limitation is imposed on the method for surface treatment of unmodified silica, and the surface treatment can be performed through any conventionally known method. For example, the surface treatment is performed through a method involving addition of unmodified silica to a mixer, subsequent addition of a treatment agent to the mixer, and stirring of the resultant mixture. The surface treatment conditions (e.g., temperature and the amount of a treatment agent relative to silica) can be appropriately determined depending on, for example, the types of silica and the treatment agent.

Modified silica has, on its surface, a functional group besides a hydroxyl group. The functional group is preferably at least one species selected from the group consisting of an amino group, an amido group, a carboxy group, a hydrocarbyloxycarbonyl group, a mercapto group, and a (poly)sulfide group, since such a functional group more effectively improves the dispersibility of silica in a rubber component. The term "(poly)sulfide group" includes both a "sulfide group" and a "polysulfide group." The hydrocarbyl group contained in the hydrocarbyloxycarbonyl group is preferably a C1 to C12 linear or branched alkyl group, a C2 to C12 linear or branched alkenyl group, a C3 to C12 cycloalkyl group, or a C6 to C12 aryl group. No particular limitation is imposed on the method for bonding the aforementioned functional group to the silica surface. For example, the method may involve varying the types and combinations of treatment agents used for preparation of modified silica.

The amount of modified silica contained in the rubber composition is preferably 20 parts by mass or more, more preferably 25 parts by mass or more, relative to 100 parts by mass of the polymer components contained in the rubber composition, in order to secure the wear resistance of the resultant crosslinked rubber and to improve the low hysteresis loss property of the crosslinked rubber. The amount of modified silica is preferably 130 parts by mass or less, more preferably 110 parts by mass or less, relative to 100 parts by mass of the polymer components contained in the rubber composition, in order to prevent impairment of the wear resistance of the resultant crosslinked rubber. A single type of modified silica may be used, or two or more types of modified silica may be used in combination.

In the case where the polymer (A) has an average ethylene chain length of 2 to 20, the ratio Ma/Mb by mass (wherein Ma represents the amount of the polymer (A) contained in the rubber composition, and Mb represents the amount of modified silica contained in the rubber composition) is preferably 0.4 to 1.5. A ratio Ma/Mb of 0.4 or more leads to sufficient low hysteresis loss property of the crosslinked rubber, whereas a ratio Ma/Mb of 1.5 or less leads to high strength of the crosslinked rubber. The ratio Ma/Mb is more preferably 0.6 to 1.5, still more preferably 0.8 to 1.4.

<Additional Component>

The rubber composition of the present disclosure may contain a component different from the polymer (A) and the modified silica (B) (hereinafter the component may be referred to as an "additional component"), so long as the effects of the present disclosure are not impaired. The additional component will next be described.

The rubber composition of the present disclosure may contain, besides modified silica, an inorganic filler different from modified silica (hereinafter the inorganic filler may be referred to as an "additional inorganic filler"). Examples of the additional inorganic filler include unmodified silica and carbon black. The unmodified silica is, for example, any of the aforementioned types of silica, and is preferably wet silica.

Examples of the carbon black include, but are not particularly limited to, GPF, FEF, HAF, ISAF, and SAF. The rubber composition may contain any reinforcing inorganic filler (e.g., clay or calcium carbonate) besides silica or carbon black. In the case where such an additional inorganic filler is used, the amount of the inorganic filler (the total amount of the modified silica and the additional inorganic filler) contained in the rubber composition is preferably 25 to 130 parts by mass, more preferably 30 to 110 parts by mass, relative to 100 parts by mass of the total amount of the polymer components contained in the rubber composition. In the case where the additional inorganic filler is used, the ratio of the modified silica to the inorganic filler in the rubber composition is preferably 50 mass % or more, more preferably 70 mass % or more.

The rubber composition generally contains a crosslinking agent. Examples of the crosslinking agent include sulfur, sulfur halides, organic peroxides, quinone dioximes, organic polyamine compounds, and alkyl phenolic resins having a methylol group. Sulfur is generally used. The amount of sulfur is preferably 0.1 to 5 parts by mass, more preferably 0.5 to 3 parts by mass, relative to 100 parts by mass of the total amount of the rubber components contained in the rubber composition.

The rubber composition may contain, besides the polymer (A), a rubber component different from the polymer (A) (hereinafter the rubber component may be referred to as an "additional rubber component"). Examples of the type of the additional rubber component include, but are not particularly limited to, butadiene rubber (BR, such as high cis BR having a cis-1,4 bond content of 90% or more), styrene butadiene rubber (SBR), natural rubber (NR), isoprene rubber (IR), styrene-isoprene copolymer rubber, and butadiene-isoprene copolymer rubber. The additional rubber component is preferably a conjugated diene-based polymer, more preferably butadiene rubber or styrene butadiene rubber. In the case where such an additional rubber component is used, the amount of the additional rubber component is preferably 5 to 70 parts by mass, more preferably 10 to 50 parts by mass, relative to 100 parts by mass of the total amount of the rubber components (the polymer (A) and the additional rubber component) contained in the rubber composition.

The amount of the polymer (A) contained in the rubber composition is preferably 30 mass % or more, more preferably 50 mass % or more, still more preferably 70 mass % or more, relative to the total amount of the rubber components contained in the rubber composition, from the viewpoint that the resultant crosslinked rubber exhibits sufficiently improved strength and wear resistance. No particular limitation is imposed on the upper limit of the amount of the polymer (A), and the upper limit can be determined depending on the amount of the additional rubber component used.

The rubber composition may contain, in addition to the aforementioned components, any additive that is commonly used in a rubber composition for tire. Examples of the additive include an antioxidant, zinc oxide, stearic acid, a softener, a vulcanization accelerator, a silane coupling agent, a compatibilizer, a vulcanization aid, a process oil, a processing aid, and an anti-scorching agent. The amount of such an additive incorporated into the rubber composition may be appropriately determined, so long as the advantageous effects of the present disclosure are not impaired.

<<Crosslinked Product and Tire>>

The rubber composition of the present disclosure can be prepared through mixing of the polymer components, the crosslinking agent, and an optional component by means of, for example, an open-type kneader (e.g., a roll) or a closed-type kneader (e.g., a Banbury mixer). The polymer composition is prepared into a crosslinked product through molding and subsequent crosslinking (vulcanization). The resultant crosslinked polymer can be applied to various rubber products. For example, the crosslinked polymer can be applied to tires (e.g., tire tread, undertread, carcass, sidewall, and bead); sealing materials, such as packing, gasket, weather strip, and O-ring; interior and exterior surface materials for various vehicles, such as automobile, ship, aircraft, and train; building materials; vibration-proof rubbers for industrial machines and facilities; hoses and hose covers, such as diaphragm, roll, radiator hose, and air hose; belts, such as belts for power transmission; linings; dust boots; materials for medical devices; fenders; insulating materials for electric wires; and other industrial products.

The rubber composition of the present disclosure can provide a crosslinked product that achieves sufficiently high strength and excellent wear resistance. Furthermore, in particular, the rubber composition of the present disclosure can provide a crosslinked product exhibiting high strength and excellent wear resistance and excellent low fuel consumption performance. Thus, the rubber composition of the present disclosure is particularly suitable for use as a material of a tire tread, sidewall, or both.

The tire can be produced by a customary method. For example, the rubber composition of the present disclosure is mixed by means of a kneader to form a sheet, and the sheet is disposed at a predetermined position and vulcanized by a customary method, to thereby form a tread rubber or a sidewall rubber. A pneumatic tire is thereby produced.

EXAMPLES

The following will specifically describe the present invention based on examples, but the contents of the present invention are not limited to these examples. Unless otherwise specified, the units "part(s)" and "%" described in Examples and Comparative Examples refer to "part(s) by mass" and "mass %," respectively.

Physical properties of a polymer were determined as described below.

[Vinyl bond content (mol %)]: the 1,2-vinyl bond content of a polymer was determined by means of $^1$H-NMR (500 MHz).

[Weight average molecular weight (Mw)]: the molecular weight (in terms of polystyrene) was determined from the retention time corresponding to the maximum peak top of a gel permeation chromatography (GPC) curve obtained by means of GPC (HLC-8120GPC (trade name, manufactured by Tosoh Corporation)).

(GPC Conditions)
Column: trade name "GMHXL" (manufactured by Tosoh Corporation) (two columns)
Column temperature: 40° C.
Mobile phase: tetrahydrofuran
Flow rate: 1.0 mL/min
Sample concentration: 10 mg/20 mL

[Hydrogenation rate (%)]: the hydrogenation rate was determined by means of $^1$H-NMR (500 MHz).

[Average ethylene chain length]: the average ethylene chain length was calculated by the following formula (6):

(Average ethylene chain length)=(the number of 1,4-butylene units)/(the number of 1,4-butylene chains)     (6)

"the number of 1,4-butylene units" and "the number of 1,4-butylene chains" were determined by means of $^{13}$C-NMR.

Production Example 1: Preparation of Surface-Modified Silica

Silica (trade name: Hi-Sil EZ160Z, manufactured by PPG Silica Products) (1,000 g) was added to a Henschel mixer, and the temperature in the mixer was adjusted to 100° C. 3-Mercaptopropyltrimethoxysilane (71.43 g) was then added with spraying to the mixer, and the resultant mixture was stirred for 10 minutes. Subsequently, stearic acid (trade name: LUNAC S-30, manufactured by Kao Corporation) (40 g) was added to the mixer, and then the temperature in the mixer was increased to 120° C., followed by further stirring for 30 minutes, to thereby prepare surface-modified silica M.

Production Example 2: Synthesis of Polymer A1

Cyclohexane (25,800 g), tetrahydrofuran (26 g), styrene (1,462 g), and 1,3-butadiene (2,752 g) were added to an autoclave reactor (inner volume: 50 L) purged with nitrogen. After internal temperature of the reactor was adjusted to 45° C., n-butyllithium solution in cyclohexane (47.86 mmol as n-butyllithium) was added to initiate polymerization. The polymerization was performed under adiabatic conditions, and the maximum temperature reached 85° C.

After the polymerization conversion had reached 99%, butadiene (86 g) was added to the reaction mixture and stirred for one minute. Then, silicon tetrachloride (0.31 g) was added to the reaction mixture. After 5 minutes, [N,N-bis(trimethylsilyl)aminopropyl]methyldiethoxysilane (9.1 g) was added to the mixture and then stirred for 15 minutes. The vinyl bond content of the polymer in the reaction mixture was determined to be 27 mol %.

Subsequently, the resultant reaction mixture was heated to 80° C. or higher, and then hydrogen was introduced into the reactor. Thereafter, [bis(η5-cyclopentadienyl) titanium(furfuryloxy) chloride] (which may be referred to as "[chlorobis(2,4-cyclopentadienyl)titanium(IV)furfuryl alkoxide]") (2.96 g), diethylaluminum chloride (1.32 g), and n-butyllithium (1.28 g) were added to the reaction mixture and hydrogenation reaction was proceed until hydrogenation rate reached to 95%. During hydrogenation reaction, hydrogen pressure in reactor was kept 0.7 MPa or higher. After the cumulative hydrogen amount had reached a predetermined level, the reaction mixture was removed from the reactor at room temperature and ambient pressure.

Subsequently, the reaction mixture was moved to desolvation vessel and the solvent was removed by steam stripping for 2 hours (vessel temperature: 95° C., steam temperature: 190° C.). After drying the mixture by heat roller (roll temperature: 110° C.), thereby produce a hydrogenated conjugated diene-based polymer (hereinafter referred to as "polymer A1"). Polymer A1 was found to have a weight average molecular weight of 31×10$^4$ and an average ethylene chain length of 4.0.

Production Example 3: Synthesis of Polymer A2

The synthesis process was performed in the same manner as in polymer A1, except that the hydrogenation rate was changed to 90%, to thereby produce a hydrogenated conjugated diene-based polymer (hereinafter referred to as "polymer A2"). Polymer A2 was found to have a weight average molecular weight of 31×10$^4$ and an average ethylene chain length of 3.5.

Production Example 4: Synthesis of Polymer A3

The synthesis process was performed in the same manner as in polymer A1, except that the hydrogenation rate was changed to 80%, to thereby produce a hydrogenated conjugated diene-based polymer (hereinafter referred to as "polymer A3"). Polymer A3 was found to have a weight average molecular weight of 31×10$^4$ and an average ethylene chain length of 2.5.

Production Example 5: Synthesis of Polymer A4

Toluene (88 g) and a 25.4 mass % solution of triisobutylaluminum in n-hexane (78 g) were added to a 300 mL glass container containing a stirring bar in a nitrogen atmosphere. After the reaction mixture was cooled to −45° C., n-hexanol (1.02 g) was slowly added dropwise to the reaction mixture with vigorous stirring. Then the reaction mixture was allowed to stand to room temperature with stirring, to thereby prepare a 2.5 mass % solution of diisobutylaluminum mono(n-hexoxide) in toluene.

A 1.0 mass % solution of WCl$_6$ in toluene (174 g) and the above-prepared 2.5 mass % solution of diisobutylaluminum mono(n-hexoxide) in toluene (86 g) were added to a glass container containing a stirring bar in a nitrogen atmosphere, and the mixture was stirred for 15 minutes, to thereby prepare a catalyst solution.

Cyclopentene (600 g) and vinyltriethoxysilane (0.84 g) were added to a 2 L pressure-resistant reactor equipped with a stirrer in a nitrogen atmosphere, and the above-prepared catalyst solution (260 g) was added to the reactor, and stirred at 25° C. to allow polymerization. After stirring for 4 hours at 25° C., excess ethanol was added to the reaction mixture to terminate polymerization. Thereafter, the reaction mixture in the pressure-resistant reactor was drop into a large excess of ethanol containing 2,6-di-t-butyl-4-methylphenol. Subsequently, the precipitated polymer was recovered and washed with water, and then dried by means of a heat roller at 110° C., to thereby produce a cyclopentene ring-opened polymer (hereinafter referred to as "polymer A4"). Polymer A4 was found to have a weight average molecular weight of $36\times10^4$.

<Production of Rubber Composition and Evaluation of Physical Properties>

Comparative Examples 1 to 7 and Examples 1 to 5

In a first mixing step, components (formulation: as shown in Table 1 below) were mixed by means of a plastomill (inner volume: 250 mL) equipped with a temperature controller (charging rate: 71 vol %, rotation speed: 60 rpm) at 100° C. Subsequently, in a second mixing step, the above-mixed product was cooled to room temperature, and then components (formulation: as shown in Table 1 below) were mixed (charging rate: 72 vol %, rotation speed: 60 rpm) at 70° C. The product produced through the second mixing step was molded and vulcanized by means of a vulcanizing press at 160° C. for a specific period of time, to thereby produce crosslinked rubber. The crosslinked rubber was evaluated for the following properties (1) to (3).

(1) Breaking Strength

The resultant crosslinked rubber was subjected to a tensile test according to JIS K6251. Specifically, a dumbbell No. 3 test piece was prepared, and the stress at break (TB) [MPa] of the test piece was measured at room temperature. A larger TB value indicates a higher breaking strength and a higher mechanical strength of the material (i.e., superior property).

(2) Wear Resistance

The wear resistance was determined by means of a DIN wear tester (manufactured by Toyo Seiki) according to JIS K 6264 at a load of 10 N and 25° C. The results were indicated by an index relative to that of Comparative Example 6 as 100. A larger value indicates superior wear resistance.

(3) 50° C. tan δ

The 50° C. tan δ was determined by means of ARES-RDA (manufactured by TA Instruments) at 50° C. (shear strain: 5.0%, angular velocity: 100 radians/second). A smaller value indicates a smaller energy loss; i.e., superior low hysteresis loss property.

TABLE 1

| | | Example 1 | Example 2 | Example 3 | Example 4 | Example 5 | Comparative Example 1 | Comparative Example 2 |
|---|---|---|---|---|---|---|---|---|
| Components of first mixing step [phr] | Polymer A1 | 100 | | | 50 | | 100 | |
| | Polymer A2 | | 100 | | | | | 100 |
| | Polymer A3 | | | 100 | | | | |
| | Polymer A4 | | | | | 50 | | |
| | S-SBR (HPR355R) | | | | 50 | 50 | | |
| | Surface-modified silica M | 75 | 75 | 75 | 75 | 75 | | |
| | Silica | | | | | | 70 | 70 |
| | Silane coupling agent | | | | | | 5.0 | 5.0 |
| | Oil | 22 | 22 | 22 | 22 | 22 | 22 | 22 |
| | Stearic acid | 2 | 2 | 2 | 2 | 2 | 2 | 2 |
| | Zinc oxide | 2.5 | 2.5 | 3 | 3 | 3 | 3 | 3 |
| | Antioxidant | 1.0 | 1.0 | 1.0 | 1.0 | 1.0 | 1.0 | 1.0 |
| | Subtotal | 202.5 | 202.5 | 202.5 | 202.5 | 202.5 | 202.5 | 202.5 |
| Components of second mixing step [phr] | Vulcanization accelerator D | 1.5 | 1.5 | 1.5 | 1.5 | 1.5 | 1.5 | 1.5 |
| | Vulcanization accelerator CZ | 1.8 | 1.8 | 1.8 | 1.8 | 1.8 | 1.8 | 1.8 |
| | Sulfur | 1.5 | 1.5 | 1.5 | 1.5 | 1.5 | 1.5 | 1.5 |
| | Total | 206.8 | 206.8 | 206.8 | 206.8 | 206.8 | 206.8 | 206.8 |
| Evaluation of physical properties | Breaking strength [MPa] | 34 | 29 | 21 | 20 | 19 | 36 | 31 |
| | DIN wear (INDEX) | 152 | 187 | 178 | 131 | 125 | 105 | 129 |
| | 50° C. tanδ | 0.092 | 0.085 | 0.081 | 0.099 | 0.092 | 0.123 | 0.110 |

| | | Comparative Example 3 | Comparative Example 4 | Comparative Example 5 | Comparative Example 6 | Comparative Example 7 |
|---|---|---|---|---|---|---|
| Components of first mixing step [phr] | Polymer A1 | | | 50 | | |
| | Polymer A2 | | | | | |
| | Polymer A3 | 100 | | | | |
| | Polymer A4 | | | | | 50 |
| | S-SBR (HPR355R) | | 50 | 100 | 100 | 50 |
| | Surface-modified silica M | | | 75 | | |
| | Silica | 70 | 70 | | 70 | 70 |
| | Silane coupling agent | 5.0 | 5.0 | | 5.0 | 5.0 |

TABLE 1-continued

|  |  |  |  |  |  |  |
|---|---|---|---|---|---|---|
|  | Oil | 22 | 22 | 22 | 22 | 22 |
|  | Stearic acid | 2 | 2 | 2 | 2 | 2 |
|  | Zinc oxide | 3 | 3 | 3 | 3 | 3 |
|  | Antioxidant | 1.0 | 1.0 | 1.0 | 1.0 | 1.0 |
|  | Subtotal | 202.5 | 202.5 | 202.5 | 202.5 | 202.5 |
| Components of second mixing step [phr] | Vulcanization accelerator D | 1.5 | 1.5 | 1.5 | 1.5 | 1.5 |
|  | Vulcanization accelerator CZ | 1.8 | 1.8 | 1.8 | 1.8 | 1.8 |
|  | Sulfur | 1.5 | 1.5 | 1.5 | 1.5 | 1.5 |
|  | Total | 206.8 | 206.8 | 206.8 | 206.8 | 206.8 |
| Evaluation of physical properties | Breaking strength [MPa] | 23 | 21 | 17 | 17 | 20 |
|  | DIN wear (INDEX) | 110 | 131 | 99 | 100 | 128 |
|  | 50° C. tanδ | 0.018 | 0.130 | 0.079 | 0.129 | 0.125 |

Details of the components used (see Table 1) are as follows.

S-SBR: trade name "HPR355R" (styrene butadiene rubber modified with alkoxysilane, manufactured by JSR Corporation)

Silica: trade name "Hi-Sil EZ160Z" (manufactured by PPG Silica Products)

Silane coupling agent: trade name "Si75" (manufactured by Evonik)

Oil: trade name "Fukkol Aromax #3" (manufactured by FUJI KOSAN CO., LTD.)

Stearic acid: trade name "LUNAC S-30" (manufactured by Kao Corporation)

Antioxidant: trade name "Ozonone 6C" (manufactured by Seiko Chemical Co., Ltd.)

Zinc oxide: trade name "Zinc Oxide type 2" (manufactured by SEIDO CHEMICAL INDUSTRY CO., LTD.)

Vulcanization accelerator D: trade name "Nocceler D" (manufactured by OUCHI SHINKO CHEMICAL INDUSTRIAL CO., LTD.)

Vulcanization accelerator CZ: trade name "Nocceler CZ" (manufactured by OUCHI SHINKO CHEMICAL INDUSTRIAL CO., LTD.)

Sulfur: trade name "GOLDEN FLOWER SULFUR POWDER 200 Mesh" (manufactured by Tsurumi Chemical Industry Co., Ltd.)

According to the results shown in Table 1, each of the rubber compositions of Examples 1 to 5 (wherein a highly saturated polymer and modified silica were incorporated) was found to produce crosslinked rubber exhibiting well-balanced improvement in strength, wear resistance, and low hysteresis loss property. In contrast, the rubber composition of Comparative Example 5 (wherein a conjugated diene-based polymer having a hydrogenation rate of 0% was incorporated instead of a highly saturated polymer) was found to produce crosslinked rubber exhibiting lower breaking strength and wear resistance considerably than the rubber composition of Examples 1 to 5, although exhibiting better hysteresis loss property.

In Comparative Examples 1 to 3 (wherein unmodified silica was incorporated instead of modified silica), the crosslinked rubber exhibited breaking strength comparable to that in Examples 1 to 3 (wherein a conjugated diene-based polymer having the same degree of saturation (hydrogenation rate) was incorporated), but exhibited considerably poor wear resistance and low hysteresis loss property. The evaluation results of Examples 1 to 3 and Comparative Examples 1 to 3 indicated that the breaking strength was considerably improved than the results of Comparative Example 6 (wherein a conjugated diene-based polymer having a hydrogenation rate of 0% and unmodified silica were incorporated). Meanwhile, the wear resistance was found to be considerably higher in Examples 1 to 3 than in Comparative Examples 1 to 3. In Example 4 (wherein a highly saturated, hydrogenated conjugated diene-based polymer and an unhydrogenated conjugated diene-based polymer were incorporated in combination), the resultant crosslinked rubber exhibited well-balanced improvement in strength, wear resistance, and low hysteresis loss property, as compared with the case of Comparative Example 4 (wherein unmodified silica was incorporated instead of modified silica). In Example 5 (wherein a cyclopentene ring-opened polymer was incorporated as a highly saturated polymer), low hysteresis loss property was considerably improved, as compared with Comparative Example 7 (wherein unmodified silica was incorporated instead of modified silica).

The aforementioned results indicated that a rubber composition containing a highly saturated polymer and modified silica can produce crosslinked rubber exhibiting high strength and wear resistance and excellent low hysteresis loss property.

What is claimed is:

1. A rubber composition, comprising:
   (A) a polymer comprising a carbon-carbon unsaturated bond and exhibiting a value α of 0.6 or more as obtained by formula (i):

$$\alpha = (p + (0.5 \times r))/\{p + q + (0.5 \times r) + s\} \quad (i),$$

p, q, r, and s being proportions by mole of structural units of formulae (1), (2), (3), and (4), respectively in the polymer:

(1)

(2)

(3)

-continued $$—CH_2—CH=CH—CH_2—;\qquad(4)$$

and (B) modified silica wherein the polymer (A) also exhibits a value β of 0.6 or less as obtained by formula (ii):

$$\beta=(p+q)/(p+q+(0.5\times r)+s)\qquad(ii),$$

p, q, r, and s having the same meanings as in formula (i).

2. The composition of claim 1, wherein the polymer (A) exhibits a value β in a range of from 0.17 to 0.58 as obtained by the formula (ii).

3. The composition of claim 1, wherein the modified silica (B) has at least one group selected from the group consisting of an amino group, an amido group, a carboxy group, a hydrocarbyloxycarbonyl group, a mercapto group, and a (poly)sulfide group.

4. The composition of claim 1, wherein the polymer (A) has an average ethylene chain length in a range of from 2 to 20, and
wherein a mass ratio of the amount Ma of the polymer (A) to the amount Mb of the modified silica (B), Ma/Mb, is in a range of from 0.4 to 1.5.

5. The composition of claim 1, further comprising:
a rubber component different from the polymer (A),
wherein an amount of the polymer (A) is 30 mass % or more, relative to total rubber components in the rubber composition.

6. The composition of claim 1, wherein the polymer (A) further comprises a structural unit derived from an aromatic vinyl compound.

7. The composition of claim 1, wherein the polymer (A) is obtained by a process comprising reacting a conjugated diene-based polymer having an active terminal and a compound having a functional group capable of reacting with the active terminal and a functional group that interacts with silica.

8. A crosslinked product, obtained through crosslinking of the rubber composition of claim 1.

9. A tire, comprising:
a tread; and
a sidewall,
wherein the tread, the sidewall, or both comprise the crosslinked product of claim 8.

10. The composition of claim 1, wherein the modified silica (B) comprises an amino group, an amido group, a carboxy group, a hydrocarbyloxycarbonyl group, a mercapto group, and/or a (poly)sulfide group.

11. A rubber composition, comprising:
(A) a polymer comprising a carbon-carbon unsaturated bond and exhibiting a value α of 0.6 or more as obtained by formula (i):

$$\alpha=(p+(0.5\times r))/(p+q+(0.5\times r)+s)\qquad(i),$$

p, q, r, and s being proportions by mole of structural units of formulae (1), (2), (3), and (4), respectively in the polymer:

$$\begin{array}{c}CH_2—CH_3\\|\\—CH_2—CH—\end{array}\qquad(1)$$

$$\begin{array}{c}CH=CH_2\\|\\—CH_2—CH—\end{array}\qquad(2)$$

$$—CH_2—CH_2—\qquad(3)$$

$$—CH_2—CH=CH—CH_2—;\qquad(4)$$

and (B) modified silica,
wherein the polymer (A) has an average ethylene chain length in a range of from 2 to 20, and
wherein a mass ratio of the amount Ma of the polymer (A) to the amount Mb of the modified silica (B), Ma/Mb, is in a range of from 0.4 to 1.5.

12. The composition of claim 11, wherein the polymer (A) also exhibits a value β in a range of from 0.6 or less as obtained by formula (ii):

$$\beta=(p+q)/(p+q+(0.5\times r)+s)\qquad(ii),$$

wherein p, q, r, and s have the same meanings as defined in the formula (i).

13. The composition of claim 11, wherein the modified silica (B) has at least one group selected from the group consisting of an amino group, an amido group, a carboxy group, a hydrocarbyloxycarbonyl group, a mercapto group, and a (poly)sulfide group.

14. The composition of claim 11, wherein the modified silica (B) comprises an amino group, an amido group, a carboxy group, a hydrocarbyloxycarbonyl group, a mercapto group, and/or a (poly)sulfide group.

15. The composition of claim 11, further comprising:
a rubber component different from the polymer (A),
wherein an amount of the polymer (A) is 30 mass % or more, relative to total rubber components in the rubber composition.

16. The composition of claim 11, wherein the polymer (A) further comprises a structural unit derived from an aromatic vinyl compound.

17. The composition of claim 11, wherein the polymer (A) is obtained by a process comprising reacting a conjugated diene-based polymer having an active terminal and a compound having a functional group capable of reacting with the active terminal and a functional group that interacts with silica.

18. A crosslinked product, obtained through crosslinking of the rubber composition of claim 11.

19. A tire, comprising:
a tread; and
a sidewall,
wherein the tread, the sidewall, or both comprises the crosslinked product of claim 18.

20. The composition of claim 4, wherein the average ethylene chain length of the polymer (A) is in a range of from 2.2 to 15, and
wherein the mass ratio, Ma/Mb, is in a range of from 0.6 to 1.5.

* * * * *